United States Patent
Cai et al.

(10) Patent No.: US 8,432,818 B2
(45) Date of Patent: Apr. 30, 2013

(54) SYSTEM AND METHOD FOR LINK ADAPTATION OVERHEAD REDUCTION

(75) Inventors: Zhijun Cai, Euless, TX (US); James Earl Womack, Bedford, TX (US); Gordon Young, Shipston-on-Stour (GB); Takashi Suzuki, Ichikawa (JP)

(73) Assignee: Research In Motion Limited, Waterloo, Ontario (CA)

( * ) Notice: Subject to any disclaimer, the term of this patent is extended or adjusted under 35 U.S.C. 154(b) by 1206 days.

(21) Appl. No.: 11/966,074

(22) Filed: Dec. 28, 2007

(65) Prior Publication Data

US 2008/0310400 A1    Dec. 18, 2008

Related U.S. Application Data

(60) Provisional application No. 60/944,367, filed on Jun. 15, 2007.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl.
USPC .......................... 370/252; 370/352; 370/465

(58) Field of Classification Search ........................ None
See application file for complete search history.

(56) References Cited

U.S. PATENT DOCUMENTS

| | | | |
|---|---|---|---|
| 5,649,298 | A | 7/1997 | Ablay |
| 5,991,279 | A | 11/1999 | Haugli et al. |
| 6,104,929 | A | 8/2000 | Josse et al. |
| 6,545,996 | B1 | 4/2003 | Falco et al. |
| 6,622,251 | B1 | 9/2003 | Lindskog et al. |
| 6,765,896 | B1 | 7/2004 | Ahmed et al. |
| 6,917,598 | B1 | 7/2005 | Emeott et al. |
| 6,973,052 | B2 | 12/2005 | Wang et al. |
| 6,975,629 | B2 | 12/2005 | Welin |
| 7,027,400 | B2 | 4/2006 | O'Neill |
| 7,142,810 | B2 | 11/2006 | Oesterling |
| 7,221,945 | B2 | 5/2007 | Milford et al. |

(Continued)

FOREIGN PATENT DOCUMENTS

| | | |
|---|---|---|
| CA | 2344911 A1 | 12/2001 |
| EP | 0529269 A2 | 3/1993 |

(Continued)

OTHER PUBLICATIONS

U.S. Office Action dated May 11, 2011 based on U.S. Appl. No. 11/957,624.

(Continued)

*Primary Examiner* — Asad Nawaz
*Assistant Examiner* — Justin N Mullen
(74) *Attorney, Agent, or Firm* — Conley Rose, P.C.; J. Robert Brown, Jr.

(57) ABSTRACT

Systems and methods of providing link adaptation information feedback are provided. A mobile device that receives packets generates link adaptation information based on incorrectly received packets. This can involve sending link adaptation information in association with NACKs (negative acknowledgements) generated by the mobile device. The network receives this link adaptation information and performs link adaptation accordingly.

13 Claims, 8 Drawing Sheets

U.S. PATENT DOCUMENTS

| | | | |
|---|---|---|---|
| 7,366,124 B2 | 4/2008 | Lee et al. | |
| 7,372,818 B2 | 5/2008 | Fraser et al. | |
| 7,505,751 B1 | 3/2009 | Backes | |
| 7,596,366 B2 | 9/2009 | Van Bosch et al. | |
| 7,899,003 B2 | 3/2011 | Xu | |
| 2002/0064140 A1 | 5/2002 | Numminen | |
| 2002/0154611 A1 | 10/2002 | Khullar | |
| 2003/0021243 A1* | 1/2003 | Hamalainen | 370/329 |
| 2003/0039218 A1 | 2/2003 | Kwak | |
| 2003/0123598 A1 | 7/2003 | Gollamudi et al. | |
| 2003/0157887 A1 | 8/2003 | Willenegger | |
| 2003/0157899 A1 | 8/2003 | Trossen et al. | |
| 2003/0185162 A1 | 10/2003 | Fraser et al. | |
| 2004/0042492 A1 | 3/2004 | Suzuki et al. | |
| 2004/0093174 A1 | 5/2004 | Lander | |
| 2004/0100911 A1* | 5/2004 | Kwan et al. | 370/252 |
| 2004/0114922 A1* | 6/2004 | Hardee | 398/17 |
| 2004/0185918 A1 | 9/2004 | Fan et al. | |
| 2004/0196801 A1 | 10/2004 | Hiramatsu | |
| 2004/0198371 A1 | 10/2004 | Balasubramanian et al. | |
| 2004/0198411 A1 | 10/2004 | Cheng et al. | |
| 2004/0253996 A1 | 12/2004 | Chen | |
| 2004/0264397 A1 | 12/2004 | Benveniste | |
| 2004/0264433 A1 | 12/2004 | Melpignano | |
| 2005/0007968 A1 | 1/2005 | Hsu et al. | |
| 2005/0009578 A1 | 1/2005 | Liu | |
| 2005/0047357 A1 | 3/2005 | Benveniste | |
| 2005/0047387 A1 | 3/2005 | Frederiksen et al. | |
| 2005/0063330 A1 | 3/2005 | Lee et al. | |
| 2005/0063331 A1 | 3/2005 | Kim et al. | |
| 2005/0113099 A1 | 5/2005 | Eriksson et al. | |
| 2005/0128998 A1 | 6/2005 | Jelitto et al. | |
| 2005/0135302 A1 | 6/2005 | Wang et al. | |
| 2005/0180324 A1* | 8/2005 | Niemela et al. | 370/230 |
| 2005/0181731 A1 | 8/2005 | Asghar et al. | |
| 2005/0201353 A1 | 9/2005 | Lee et al. | |
| 2005/0254444 A1 | 11/2005 | Meier et al. | |
| 2005/0254459 A1 | 11/2005 | Qian | |
| 2005/0281222 A1 | 12/2005 | Ranta-Aho et al. | |
| 2006/0019641 A1 | 1/2006 | Vayanos et al. | |
| 2006/0187897 A1 | 8/2006 | Dabbs et al. | |
| 2006/0209669 A1 | 9/2006 | Nishio | |
| 2006/0252449 A1 | 11/2006 | Ramesh | |
| 2007/0004374 A1 | 1/2007 | Kneckt | |
| 2007/0060167 A1 | 3/2007 | Damnjanovic et al. | |
| 2007/0061433 A1 | 3/2007 | Reynolds et al. | |
| 2007/0082620 A1 | 4/2007 | Zhang et al. | |
| 2007/0087724 A1 | 4/2007 | Jang et al. | |
| 2007/0135081 A1 | 6/2007 | Bultan et al. | |
| 2007/0177630 A1 | 8/2007 | Ranta et al. | |
| 2007/0206524 A1 | 9/2007 | Suk | |
| 2007/0254603 A1* | 11/2007 | Li et al. | 455/88 |
| 2007/0286080 A1 | 12/2007 | Kim et al. | |
| 2007/0286155 A1 | 12/2007 | Kaikkonen et al. | |
| 2007/0291673 A1 | 12/2007 | Demirhan et al. | |
| 2008/0090583 A1 | 4/2008 | Wang et al. | |
| 2008/0095252 A1 | 4/2008 | Kim et al. | |
| 2008/0101268 A1 | 5/2008 | Sammour et al. | |
| 2008/0117891 A1 | 5/2008 | Damnjanovic et al. | |
| 2008/0151828 A1 | 6/2008 | Bjorken et al. | |
| 2008/0167089 A1 | 7/2008 | Suzuki et al. | |
| 2008/0181127 A1 | 7/2008 | Terry et al. | |
| 2008/0186893 A1 | 8/2008 | Kolding et al. | |
| 2008/0186944 A1 | 8/2008 | Suzuki et al. | |
| 2008/0192703 A1 | 8/2008 | Suzuki | |
| 2008/0207229 A1 | 8/2008 | Cave et al. | |
| 2008/0219376 A1* | 9/2008 | Qi et al. | 375/285 |
| 2008/0232284 A1 | 9/2008 | Dalsgaard et al. | |
| 2008/0232310 A1 | 9/2008 | Xu | |
| 2008/0267105 A1 | 10/2008 | Wang et al. | |
| 2008/0268863 A1 | 10/2008 | Pedersen et al. | |
| 2008/0279170 A1 | 11/2008 | Malladi et al. | |
| 2008/0287091 A1 | 11/2008 | Suzuki et al. | |
| 2008/0287149 A1 | 11/2008 | Womack et al. | |
| 2008/0310333 A1 | 12/2008 | Balachandran et al. | |
| 2008/0311919 A1 | 12/2008 | Whinnett et al. | |
| 2008/0311946 A1 | 12/2008 | Britton | |
| 2009/0029671 A1 | 1/2009 | Cho et al. | |
| 2009/0034452 A1 | 2/2009 | Somasundaram et al. | |
| 2009/0046627 A1 | 2/2009 | Xu | |
| 2009/0054006 A1 | 2/2009 | Cai et al. | |
| 2009/0180414 A1 | 7/2009 | Maeda et al. | |
| 2009/0186614 A1 | 7/2009 | Aoyama et al. | |
| 2009/0252089 A1 | 10/2009 | Lim et al. | |
| 2009/0274107 A1 | 11/2009 | Park et al. | |
| 2009/0310586 A1 | 12/2009 | Shatti | |
| 2009/0327828 A1 | 12/2009 | Ojala et al. | |
| 2010/0113054 A1 | 5/2010 | Iwamura et al. | |
| 2010/0142485 A1 | 6/2010 | Lee et al. | |
| 2010/0182965 A1 | 7/2010 | Sebire | |
| 2010/0184443 A1 | 7/2010 | Xu | |
| 2010/0202382 A1 | 8/2010 | Park et al. | |
| 2010/0279715 A1 | 11/2010 | Alanara et al. | |
| 2010/0309798 A1 | 12/2010 | Fodor et al. | |

FOREIGN PATENT DOCUMENTS

| | | |
|---|---|---|
| EP | 0 924 890 A2 | 6/1999 |
| EP | 1 289 181 A1 | 3/2003 |
| EP | 1317156 A1 | 6/2003 |
| EP | 1345349 A2 | 9/2003 |
| EP | 1450240 A2 | 8/2004 |
| EP | 1 492 263 A1 | 12/2004 |
| JP | 2010515334 A | 5/2010 |
| KR | 10-2001-0080 | 6/2003 |
| KR | 10-2004-0050422 A | 6/2004 |
| WO | WO 00/21236 | 4/2000 |
| WO | 0186885 A1 | 11/2001 |
| WO | 02/33875 A1 | 4/2002 |
| WO | 0233875 A1 | 4/2002 |
| WO | 03/096707 A2 | 11/2003 |
| WO | 2004/004194 | 1/2004 |
| WO | 2005/022772 | 3/2005 |
| WO | 2005064952 A1 | 7/2005 |
| WO | 2006002379 | 1/2006 |
| WO | 2006/046754 | 5/2006 |
| WO | WO 2006/103498 A1 | 10/2006 |
| WO | 2006114710 A2 | 11/2006 |
| WO | WO 2007/014021 A2 | 2/2007 |
| WO | WO 2007/025138 A2 | 3/2007 |
| WO | 2007073118 A1 | 6/2007 |
| WO | WO 2007/073118 A1 | 6/2007 |
| WO | 2007/089797 A2 | 8/2007 |

OTHER PUBLICATIONS

Research in Motion Limited, "Semi-persistent Scheduling and DRX Control", 3GPP TSG-RAN-WG2 Meeting # 59, Aug. 2007.

Shun-Ren Yang and Yi-Bing, Lin, "Modeling UMTS Discontinuous Reception Mechanism" IEEE Transactions on Wireless Communications, Jan. 2005, pp. 312-319, vol. 4., No. 1.

Ericsson, Semi Persistent Scheduling, TSG-RAN WG2 Meeting # 55, Oct. 2006.

Ericsson, "Performance Gains of the Semi-Autonomous DRX Scheme for LTE", 3GPP TSG-RAN WG2 Meeting # 58-bis, Jun. 2007.

Nokia, Nokia Siemens Networks, "Further Considerations on DL Semi-Persistent Scheduling", 3 GPP TSG-RAN WG2 Meeting # 58, May 2007.

Samsung, "Concerns on the group scheduling", 3GPP TSG-RAN2 Meeting #57bis, R2-071135, Mar. 26-30, 2007, St. Julians, Malta.

3GPP TR 25.814 V7.1.0, "Physical layer aspects for evolved Universal Terrestrial Radio Access (UTRA) (Release 7)" (Sep. 2006).

Motorola, Inc., "optimization of VoIP of HSDPA", 3GPP TSG-RAN-WG2 Meeting #53, R2-061252, May 8-12, 2006, Shanghai, China.

PCT Search Report dated Aug. 8, 2008 based on PCT/CA2008/000770.

PCT Search Report dated Aug. 1, 2008 based on PCT/CA2008/000771.

PCT Search Report dated Feb. 28, 2009 based on PCT/US2008/073593.

European Search Report dated Dec. 16, 2008 based on EP 08 16 2639.

PCT Search Report dated Feb. 6, 2009 based on PCT/US2008/073585.

European Search Report dated Dec. 16, 2008 based on EP 08 16 2615.
PCT Search Report dated Dec. 26, 2008 based on PCT/US2008/073580.
European Search Report dated Nov. 25, 2008 based on EP 08 162 638.
U.S. Office Action dated Jun. 15, 2011 based on U.S. Appl. No. 11/741,571.
Partial European Search Report dated Aug. 24, 2011 based on European Patent Application No. EP 11 17 6042.7.
Supplementary European Search Report, EP Application No. EP 07 85 5593, Jun. 28, 2010.
Jiang, Dajie et al.; Principle and Performance of Semi-Persistent Scheduling for VoIP in LTE System; International Conference on Wireless Communications, Networking and Mobile Computing, 2007 (WiCom 2007), Sep. 21-25, 2007 (Sep. 21, 2007), pp. 2861-2864.
Fukui, N.; Study of Channel Quality Feedback in UMTS HSDPA; Personal, Indoor and Mobile Radio Communications, 2003. PIMRC 2003; 14th IEEE Proceedings on, vol. 1, pp. 336-340, Sep. 7-10, 2003 (Oct. 9, 2003).
Dottling et al.; Efficient Channel Quality Feedback Schemes for Adaptive Modulation and Coding of Packet Data,; Vehicular Technology Conference, 2004. VTC2004—Fall. 2004 IEEE 60th, vol. 2, pp. 1243-1247, Sep. 26-29, 2004 (Sep. 29, 2004).
Jeon et al.; Channel Adaptive CQI Reporting Schemes for UMTS High-Speed Downlink Packet Access; Vehicular Technology Conference, 2006. VTC2006—Fall. 2006 IEEE 64th, p. 1-5, Sep. 25-28, 2006 (Sep. 28, 2006).
European Search Report dated Sep. 12, 2007 based on EP 07 10 7587.
European Search Report dated Dec. 20, 2007 based on EP 07 10 8885.
PCT Search Report dated Apr. 17, 2008 based on PCT/CA2007/002368.
PCT Search Report dated Apr. 17, 2008 based on PCT/CA2007/000003.
PCT Search Report dated Mar. 13, 2008 based on PCT/CA2007/002311.
PCT Search Report dated May 21, 2008 based on PCT/CA2007/002299.
PCT Search Report dated Apr. 24, 2008 based on PCT/CA2008/000001.
LG Electronics Inc. "Uplink scheduling for VoIP," (R2-063273) 3GPP TSG RAN WG2 #56, Nov. 6-10, 2006, Riga, Latvia.
Samsung "VoIP support in LTE," (R1-070961) 3GPP TSG RAN WG1 Meeting #48, St. Louis, Missouri, USA, Feb. 12-16, 2007.
Lucent Technologies "Uplink Scheduling Requests for Real Time Services," (R2-062227) 3GPP TSG-RAN2 #54, Aug. 28-Sep. 1, 2006, Tallinn, Estonia.
NTT DoCoMo, Inc. "Comparison of persistent resource allocation schemes in LTE uplink," (R2-060283) 3GPP TSG RAN WG2 #56, Jan. 15-19, 2007, Riga, Latvia.
Alcatel-Lucent "DL Control Signaling and Multiplexing for VoIP," (R1-071721) 3GPP TSG RAN WG1 Meeting #48bis, St. Julians, Malta, Mar. 26-30, 2007.
NTT DoCoMo, Inc. "Uplink resource allocation scheme," (R2-062164) 3GPP TSG RAN WG2 #54, Aug. 28-Sep. 1, 2006, Tallinn, Estonia.
U.S. Office Action dated Mar. 1, 2011 based on U.S. Appl. No. 11/969,082.
U.S. Office Action dated Jan. 31, 2011 based on U.S. Appl. No. 11/957,624.
U.S. Office Action dated Mar. 2, 2011 based on U.S. Appl. No. 11/968,518.
Research in Motion Limited: "Semi-persistent Scheduling and DRX Control" 3GPP Draft; R2-073245, 3rd Generation Partnership Project (3GPP), Mobile Competence Centre ; 650, Route Des Lucioles ; F-06921 Sophia-Antipolis Cedex ; France, vol. tsg_ran\WG2_RL2\TSGR2_59\Docs, no. Athens, Greece; 20070820, Aug. 13, 2007, XP050135972.
Nokia, Nokia Siemens Networks: "Further considerations on DL semi-persistent scheduling" 3GPP TSG-RAN WG2 Meeting #58, R2-071743, May 7, 2007, pp. 1-3, XP002503687.

Ericsson: "Drx and VoIP" 3rd Generation Partnership Project (3GPP), [Online] Aug. 15, 2007, XP050135937 Retrieved from the Internet: URL: ftp://ftp.3gpp.org/tsg_ran/WG2_RL2/TSGR2_59/Docs/R2-073208.zip.
US Office Action dated Mar. 16, 2011 based on U.S. Appl. No. 12/193,991, 19 pages.
U.S. Office Action dated Oct. 28, 2011 based on U.S. Appl. No. 11/957,624.
U.S. Office Action dated Nov. 8, 2011 based on U.S. Appl. No. 11/958,547.
Notice of Acceptance dated Nov. 11, 2011 for Australian Patent Application No. 2007354841.
European Search Report dated Nov. 14, 2011 based on European Application No. EP 11 17 6042.
US Office Action dated Dec. 12, 2011 based on U.S. Appl. No. 13/287,731.
European Search Report dated Nov. 28, 2011 based on European Application No. EP 11 18 6713.
US Office Action dated Dec. 5, 2011 based on U.S. Appl. No. 11/741,571.
Japanese Office Action; Application No. 2010-511453; Feb. 28, 2012; 4 pages.
3GPP TSG RAN WG1 #49; "Uplink Grant Capacity in Response to RAN2 LS"; R1-072532; Kobe, Japan, May 7-11, 2007; 7 pages.
Nokia: "Scheduling of LTE DL VoIP", 3GPP Draft; R2-070006 LTE DL VOIP, 3rd Generation Partnership Project (3GPP), Mobile Competence Centre ; 650, Route Des Lucioles ; F-06921 Sophia-Antipolis Cedex ; France, vol. RAN WG2, no. Sorrento, Italy; 20070112, Jan. 12, 2007, XP050133126, [retrieved on Jan. 12, 2007].
Research in Motion: "Uplink VoIP scheduling with Fast Indication", 3GPP Draft; R2-071961, 3rd Generation Partnership Project (3GPP), Mobile Competence Centre ; 650, Route Des Lucioles ; F-06921 Sophia-Antipolis Cedex ; France, vol. RAN WG2, no. Kobe, Japan; 20070504, May 4, 2007, XP050134839, [retrieved on May 4, 2007].
Ericsson: "Comparison of scheduling methods for LTE", 3GPP Draft; R2-070796 Scheduling Methods, 3rd Generation Partnership Project (3GPP), Mobile Competence Centre ; 650, Route Des Lucioles ; F-06921 Sophia-Antipolis Cedex ; France, vol. RAN WG2, no. St. Louis, USA; 20070209, Feb. 9, 2007, XP050133821, [retrieved on Feb. 9, 2007].
Ericsson: "Semi-persistent scheduling", 3GPP Draft; R1-062863, 3rd Generation Partnership.Project (3GPP), Mobile Competence Centre ; 650, Route Des Lucioles ; F-06921 Sophia-Antipolis Cedex ; France, vol. RAN WG1, no. Seoul, Korea; 20061004, Oct. 4, 2006, XP050103348, [retrieved on Oct. 4, 2006].
Research in Motion Ltd: "Semi-persistent Scheduling and DRX Control", 3GPP Draft; R2-072777, 3rd Generation Partnership Project (3GPP), Mobile Competence Centre ; 650, Route Des Lucioles ; F-06921 Sophia-Antipolis Cedex ; France, vol. RAN WG2, no. Orlando, USA; 20070622, Jun. 22, 2007, XP050135555, [retrieved on Jun. 22, 2007].
Research in Motion Ltd: "Large IP packet delivery during VoIP session", 3GPP Draft; R2-072776, 3rd Generation Partnership Project (3GPP), Mobile Competence Centre ; 650, Route Des Lucioles ; F-06921 Sophia-Antipolis Cedex ; France, vol. RAN WG2, no. Orlando, USA; 20070622, Jun. 22, 2007, XP050135554, [retrieved on Jun. 22, 2007].
Extended European Search Report dated Nov. 14, 2011 issued in respect of European Patent Application No. 08733534.5.
Extended European Search Report dated Nov. 25, 2011 issued in respect of European Patent Application No. 11186711.5.
Dan Wu, Xuemail Gu, Qing Guo: "Blind Signal-to-Noise Ratio Estimation Algorithm with Small Samples for Wireless Digital Communications"—ICIC 2006, LNCIS 345, [Online] 2006, pp. 741-478.
3GPP TSG RAN WG2; "Persistent Scheduling"; R2-061920; Cannes, France; Jun. 27-30, 2006; 5 pages.
3GPP TSG-RAN WG2 #55; "Persistent Scheduling and Dynamic Allocation"; R2-062788; Seoul, Korea; Oct. 9-13, 2006; 6 pages.

* cited by examiner

SYSTEM AND METHOD FOR LINK ADAPTATION OVERHEAD REDUCTION

RELATED APPLICATION

This application claims the benefit of U.S. Provisional Patent Application No. 60/944,367 filed Jun. 15, 2007.

FIELD OF THE APPLICATION

The application relates to the transmission of packets such as VoIP (Voice over Internet Protocol) packets over a wireless link, and to methods of adapting an MCS (modulation and coding scheme) used for such transmission.

BACKGROUND

VoIP enables telephony over the Internet or through any other IP-based network. Many wireless networks such as UMTS (Universal Mobile Telecommunications System) networks currently support VoIP service for mobile devices. 3GPP LTE (Long Term Evolution) is a Third Generation Partnership Project that sets out to improve the UMTS mobile phone standard in order to cope with future requirements. So far 3GPP LTE assumes that fast link adaptation should be supported for VoIP. Fast link adaptation involves matching modulation, coding, and protocol parameters in accordance with conditions of the radio link.

In order to match the modulation and coding scheme, fast link adaptation involves quick channel state feedback to the transmitter. Unfortunately, this can introduce a substantial overhead, for example as high as 5 information bits/2 ms/user for full fast link adaptation during an HSDPA (High-Speed Downlink Packet Access) operation. The number of VoIP users can be very large. For example, it has been shown that about 300 voice users can be supported in 5 MHz, 12.2 KBPS AMR (Adaptive Multi-Rate) and 5% outage (see TR 25.814, Physical Layer Aspects for EUTRAN (evolved universal terrestrial radio access network)). If each VoIP user uses fast link adaptation, then the total overhead could be significant, especially on the uplink. This can reduce system capacity as well as increase link interference. Fast link adaptation using uplink signalling can also increase power consumption for mobile devices causing shorter battery life.

It has been shown that for low constant rate services like VoIP, most of the AMC (adaptive modulation and coding) gain comes from HARQ (Hybrid Automatic Repeat-reQuest) rather than from fast link adaptation. This is partially due to the fact that the variation of voice payload size is not large compared to that of background data. The effectiveness of fast link adaptation can be reduced for traffic featuring this low variation of payload size. For the most part, the HARQ process compensates for the fast-fading effect effectively.

BRIEF DESCRIPTION OF THE DRAWINGS

Embodiments will now be described with reference to the attached drawings in which.

DETAILED DESCRIPTION OF EMBODIMENTS

Figure 1A:
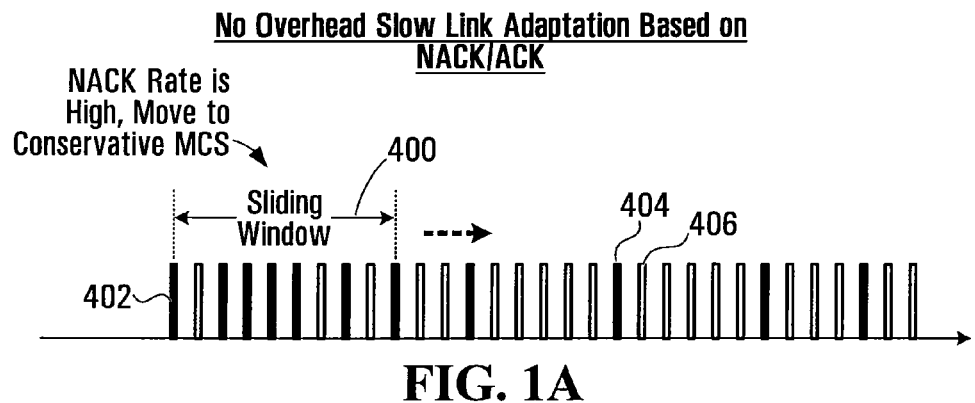
FIGS. 1A to 1D are signalling diagrams showing slow link adaptation.

According to one broad aspect, the application provides a method in a mobile device comprising: receiving packets; transmitting fast MCS link adaptation information based on incorrectly received packets.

According to another broad aspect, the application provides a method in a wireless network comprising: transmitting packets; receiving at the wireless network fast MCS link adaptation information based on transmitted packets that were incorrectly received; based on the fast MCS link adaptation information, adjusting an MCS used to transmit the packets.

According to another broad aspect, the application provides a mobile device comprising: a wireless access radio configured to receive packets; a fast link adaptation information generator configured to generate fast MCS link adaptation information based on incorrectly received packets, and to transmit the fast MCS link adaptation information using the wireless access radio.

According to another broad aspect, the application provides a wireless network comprising: a transmitter that transmits packets; a receiver that receives fast MCS link adaptation information based on transmitted packets that were incorrectly received; a fast link adaptation information processor that adjusts an MCS used to transmit the packets based on the fast MCS link adaptation information.

Further embodiments provide computer readable media having computer executable instructions stored thereon, for execution by a wireless device or network device for example, that control the execution of one or more of the methods summarized above, or described below.

Methods of Slow Link Adaptation

Methods of performing slow link adaptation are described in applicants co-pending U.S. application Ser. No. 11/690,615 filed Mar. 23, 2007 entitled "Slow Adaptive Modulation and Coding State (MCS) for LTE VoIP", hereby incorporated by reference in its entirety. Some of the methods are based on NACK-only (negative acknowledgement-only) feedback with no explicit signaling of the MCS. Other of the methods are based on explicit signaling by the mobile device to the network indicating a requested MCS. This can be an absolute or relative (to current MCS) decision. More generally, the feedback mechanism can be based on layer 1 CQI signalling or layer 2 signalling.

A specific example of performing slow link adaptation based on NACK feedback rate will now be described. The mobile device is already feeding back NACK information, and this is then used to derive a suitable MCS for the user. In a specific example, the network monitors the mobile device's NACK rate and, based on the NACK rate, slowly makes changes to the mobile device's assigned MCS. In some cases, NACK-only feedback is employed, in which case the mobile device transmits NACKs, but does not transmit ACKs. The detailed embodiments apply to received packets that are VoIP packets. More generally, embodiments may find application to receiving constant rate packets, receiving real-time packets, or receiving constant rate real-time packets.

For example, consider a mobile device that is initially assigned M=16 QAM, C=¾ (where 1/C represents the amount of coding redundancy, and hence, the coding's robustness, and M represents the modulation scheme). If, after a period of time, the network detects a NACK feedback rate which is larger than the transition threshold, the network switches the mobile device to more conservative modulation and coding requirements (for example, with M=QPSK, C=½). An advantage is that there is no need for channel feedback from the mobile device so both the mobile device's battery consumption and uplink interference can be reduced. The disadvantage is that the reaction time to adjust the MCS may be longer than direct feedback. A specific example using NACK/ACK feedback is shown in FIG. 1A. In this example, a sequence of received NACKs/ACKs is indicated at 402. where the solid lines (such as line 404) represent NACKs, and the hollow lines (such as line 406) represent ACKs. The number of NACKs received over a sliding window 400 is monitored, and if the NACK rate is high, then the mobile device is moved to a more conservative MCS.

Figure 1B:
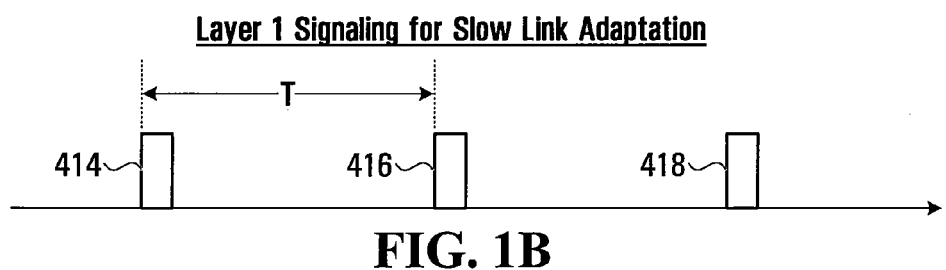

In a specific example of using explicit signalling to transmit an MCS request from the mobile device, layer 1 signalling for slow link adaptation comprising a 1 bit CQI can be utilized for signaling the request, the 1 bit indicating a relative decision on the MCS compared to the previous MCS. An example of this is shown in FIG. 1B which is a signalling diagram showing Layer 1 signalling for slow link adaptation. In the illustrated example, CQI feedback 414 is sent for example every T=100 ms In a specific example, a 5 bit CQI feedback is employed, and a repetition code is used to repeat the single bit 5 times to improve the reliability.

In another example, mobile devices may feed back an absolute average channel quantity to the base station. This might for example be a 5 Bit CQI information field that is fed back in a very slow rate, e.g., to "fit" for the user equipment's (UE's) average SNR condition. The base station makes slow link adaptation decisions based on this feedback.

Figure 1C:
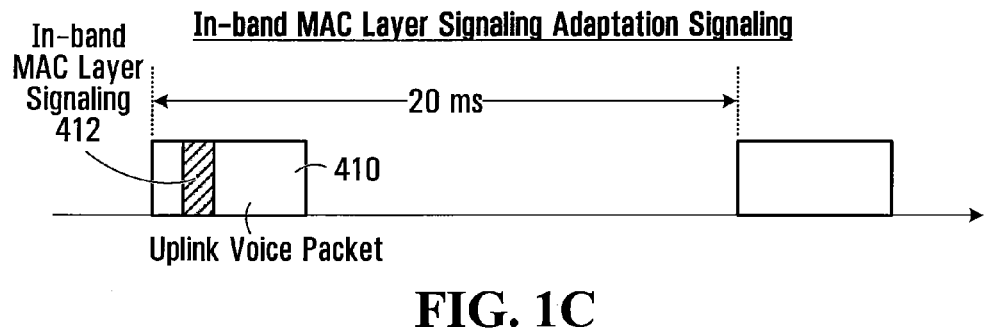
Figure 1D:
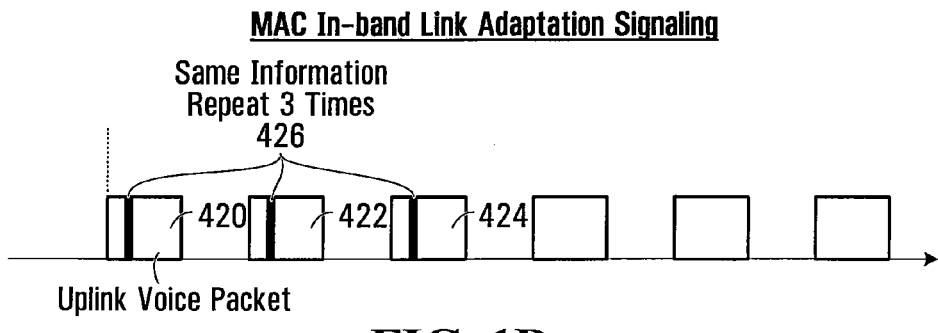

In another specific example of using explicit signalling, layer 2 signalling consisting of MAC layer signalling is employed. This may, for example, performed with an optional MAC header of the MAC PDU (medium access control payload data unit) transmitted from the mobile device to the base station. Alternatively, it could be separate MAC control signaling. FIG. 1C is a signalling diagram showing in-band MAC layer signalling for slow link adaptation. By using MAC signaling, the layer 1 CQI can be turned off completely. In the specific example shown in FIG. 1C, an uplink voice packet is indicated at 410 and in-band MAC layer signalling is indicated at 412. The MAC signaling may be repeated multiple times to further enhance the reliability as shown in FIG. 1D which shows a signalling diagram featuring quick repeat of MAC layer signalling. In the specific example shown in FIG. 1D, uplink voice packets are indicated at 4120,422,424 and in-band MAC layer signalling 426 is repeated three times.

Further methods of performing slow link adaptation are described in applicants co-pending U.S. application Ser. No. 11/741,571 filed Apr. 27, 2007 hereby incorporated by reference in its entirety. Some of the methods are based on ACK-only feedback with no explicit signaling of the MCS. These are similar to the above-described methods based on NACK-only feedback, but using ACK-only feedback instead.

Fast MCS Adaptation

All the embodiments described above have involved slow MCS adaptation. The MCS is updated on the basis of information that is accumulated over some period of time, be it a number of ACKs or NACKs over a time, an average SNR over a time period etc. In another embodiment, methods and systems for performing fast MCS adaptation are provided. When a mobile device receives a VoIP packet in error, a NACK will be fed back to the base station. In general, this may imply that the channel condition is poor. When the channel condition is poor, it is advantageous to take measures to improve the reliability of transmission as soon as possible, for example by changing the MCS, to increase the likelihood of subsequent successful transmission and reception. In some embodiments, fast MCS link adaptation information is transmitted in association with NACK feedback to allow the transmitter to make quicker MCS adaptation decisions. In some embodiments, the NACK and the fast MCS link adaptation information are combined in a code division multiplex (CDM) manner. One example would be a scheme that incorporates cylic shifts of a Zadoff-Chu sequence.

The NACK and fast MCS link adaptation can be combined as described above in the context of NACK-only feedback (described previously) or in ACK/NACK feedback.

In some embodiments, an ACK-only feedback scheme is employed, and in such a case there are no NACKs with which to combine the fast MCS link adaptation information.

In some embodiments, the fast MCS link adaptation information is sent back for every VoIP packet that is received in error, but using a mechanism other than a combination with a NACK.

In the detailed examples of fast link adaptation described below, the fast MCS link adaptation information is a CQI (channel quality indicator) that is fed back from the mobile device to the base station, this consisting of information that is directly reflective of the quality of the channel. This typically is an instantaneous SNR (signal-to-noise ratio) or some representation of SNR. A transmitter can look at the SNR value fed back, and make an MCS adaptation decision based on that. More generally, the fast MCS link adaptation information is any information that can be fed back from the mobile device to the base station that allows a fast MCS adaptation decision to be made at the transmitter. In some embodiments, the link adaptation information is a received signal value such as an SNR, RSSI (received signal strength indicator) or RSRP (reference symbol received power). A fast MCS adaptation decision is fast in the sense that it can be made very quickly on the basis substantially instantaneous channel conditions reflected by the information provided as opposed to slow adaptation information that is a function of conditions that occur over a period of time and/or accumulated over a period of time before a decision is made. CQI that is fed back based on instantaneous conditions is a specific example of fast link adaptation information. In another example, the fast MCS link adaptation information is more directly representative of an MCS to use. For example, it can be an indication of the MCS that the mobile device has determined to be appropriate based on instantaneous channel conditions. The mobile device can determine which MCS is appropriate in any suitable manner. In a specific example, the mobile device measures the SNR and makes an MCS decision based on that. The MCS decision can be fed back as a direct encoding of the MCS. Alternatively, a differential encoding of the MCS can be employed for the purpose of feeding back the MCS decision to the network. For example, if changes in MCS are limited to be one or two steps at a time, a few bits can be used to signal the change in MCS.

In some embodiments, the fast MCS link adaptation information is consistent with that defined for HSDPA operation with the exception of the fact that it is not sent as frequently. This provides a mechanism for transmitting 5 bits of CQI information every 2 ms.

In some embodiments, the fast MCS adaptation information is consistent with that defined in LTE TR.25.814.

FIRST EXAMPLE

Feedback CQI for Every NACK

In a first specific example of fast MCS adaptation, each time a NACK is fed back from a mobile device to the network, a CQI (channel quality indication) is also fed back. On the basis of this, the transmitter makes an MCS adaptation decision for the mobile device. This decision can be to leave the MCS unchanged, or to change the MCS.

Figure 2:
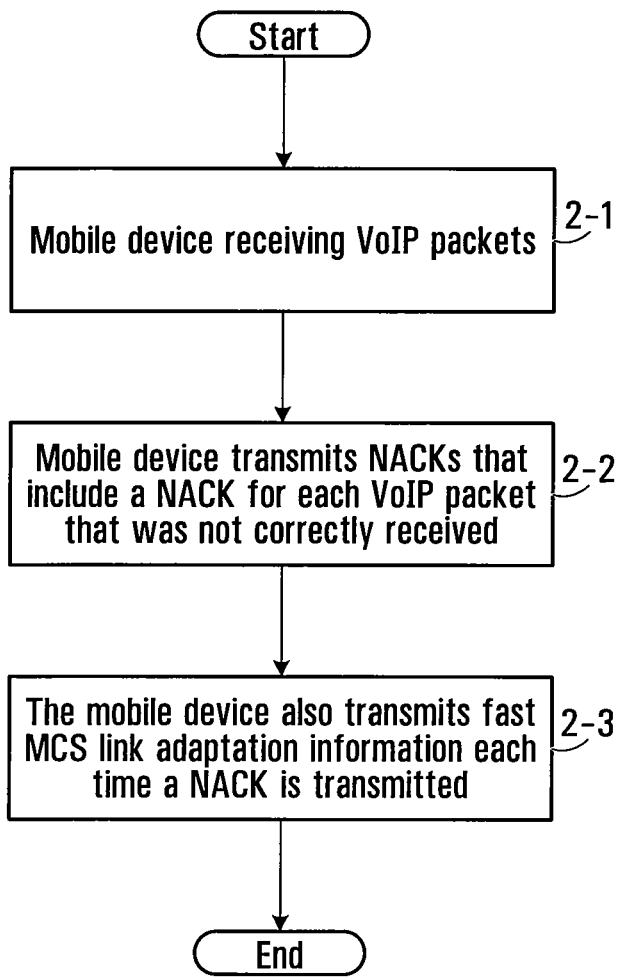
FIGS. 2 to 5 are flowcharts of methods of performing MCS adaptation.
Figure 3:
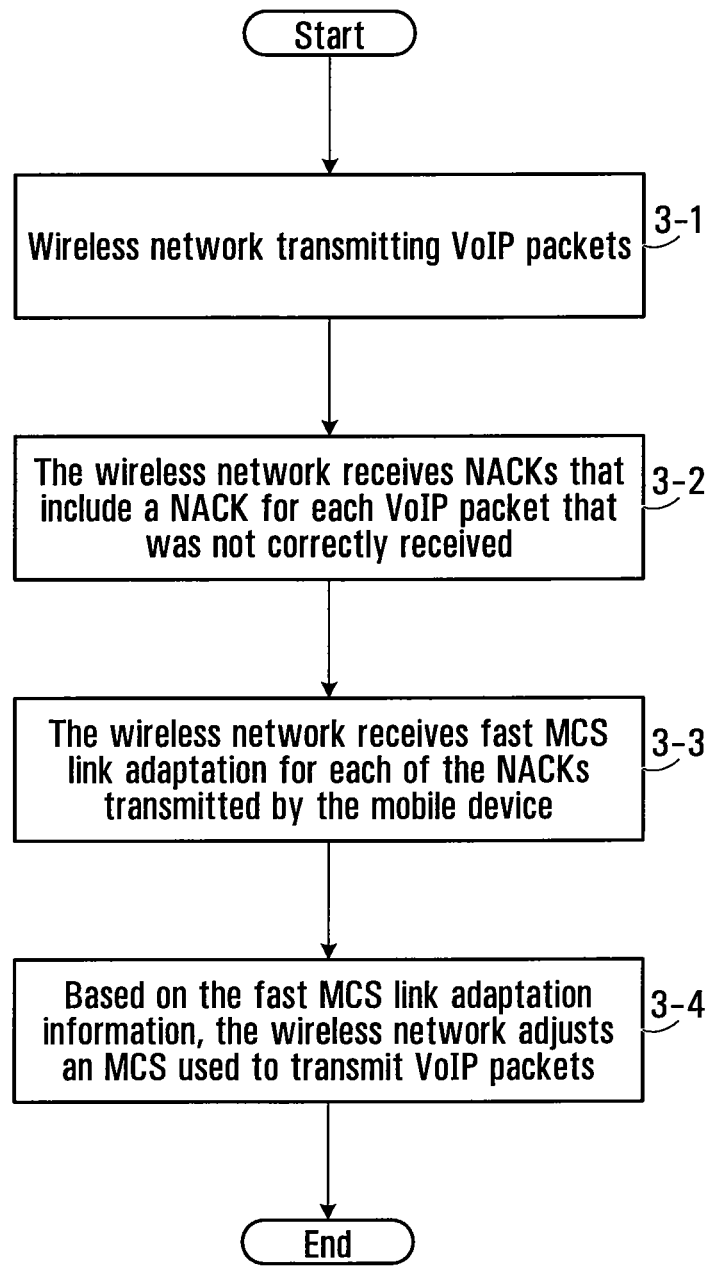

Flowcharts of this approach are shown in FIGS. 2 and 3. FIG. 2 shows method steps executed by a mobile device, while FIG. 3 shows method steps executed by the network.

Referring first to FIG. 2, for the mobile device, the method starts at step 2-1 with the mobile device receiving VoIP packets. At step 2-2, the mobile device transmits NACKs that include a NACK for each VoIP packet that was not correctly received. In step 2-3 the mobile device also transmits fast MCS link adaptation information each time a NACK is transmitted. A precursor to step 2-3 involves making a determination of the fast MCS link adaptation information that is to be fed back. Many examples have been given previously of what this may involve.

Referring now to FIG. 3, for the network, the method starts at step 3-1 with the wireless network transmitting VoIP packets. In step 3-2, the wireless network receives NACKs (negative acknowledgements) that include a NACK for each VoIP packet that was not correctly received. In step 3-3, the wireless network receives fast MCS link adaptation for each of the NACKs transmitted by the mobile device. In step 3-4, based on the fast MCS link adaptation information, the wireless network adjusts an MCS used to transmit VoIP packets.

SECOND EXAMPLE

Feedback CQI Based on Number of NACKs within a Sliding Window

In a second specific example, link adaptation information such as a CQI is fed back in association with the NACK feedback, but this does not involve transmitting a CQI for each and every NACK. Some additional condition needs to be satisfied before the CQI is fed back. For example, in one implementation, the mobile device monitors NACK transmissions (equivalently, the mobile device monitors the number of packet received in error) for the occurrence of a certain number of NACKs within a period defined by a sliding window. Upon determining that the certain number of NACKs has occurred within the period, the mobile device feeds back a CQI.

After feeding back a CQI in this manner, in some implementations, the mobile device does not send another CQI until the next time the condition (number of NACKs in sliding window greater than certain number) is true. Of course, since the window is sliding, this could be as soon as the next NACK.

Alternatively, after feeding back a CQI in this manner, the mobile device feeds back a CQI for every NACK for some time.

As in the first example, on the basis of the CQI fed back, the transmitter makes an MCS adaptation decision for the mobile device. This decision can be to leave the MCS unchanged, or to change the MCS.

Figure 4:
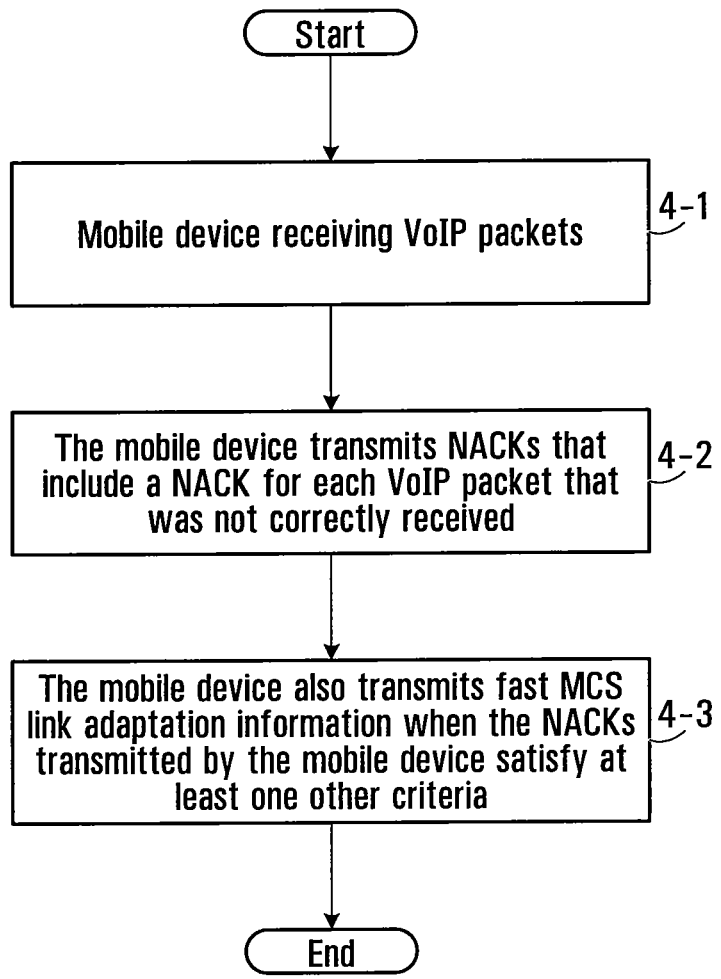
Figure 5:
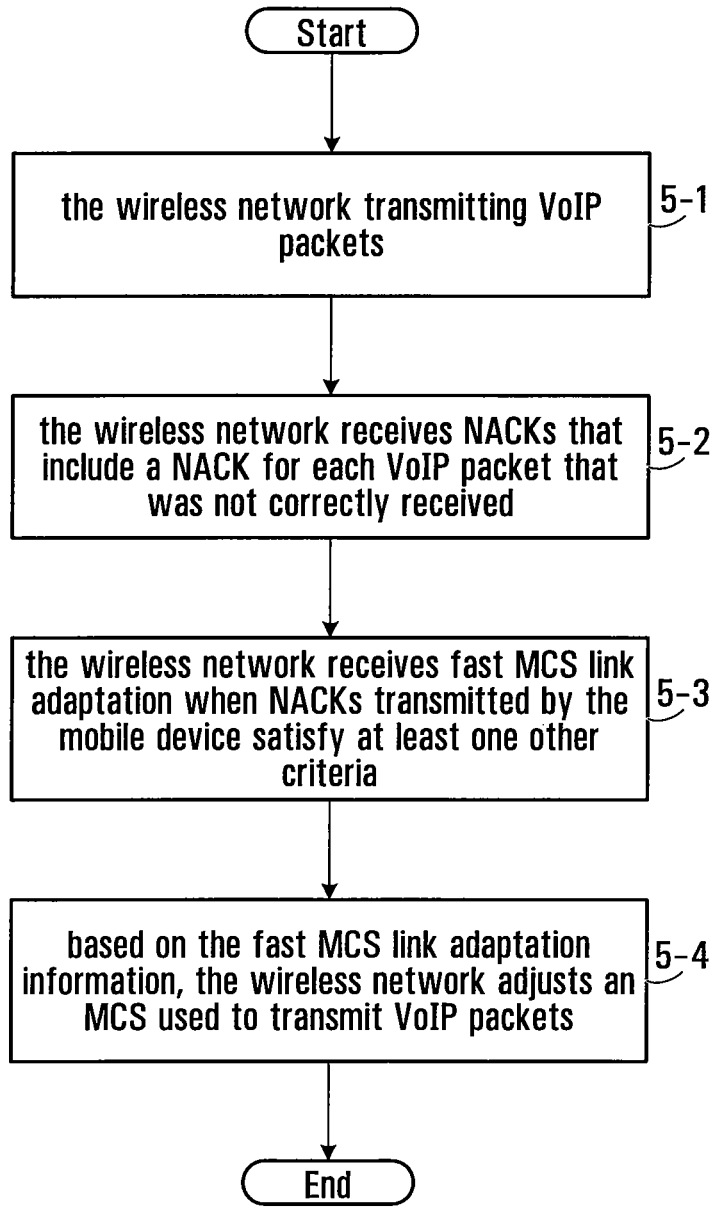

Flowcharts of this approach are shown in FIGS. 4 and 5. FIG. 4 shows method steps executed by a mobile device, while FIG. 5 shows method steps executed by the network.

Referring now to FIG. 4, for the mobile device, the method starts at step 4-1 with the mobile device receiving VoIP packets. At step 4-2, the mobile device transmits NACKs that include a NACK for each VoIP packet that was not correctly received. In step 4-3 the mobile device also transmits fast MCS link adaptation information when the NACKs transmitted by the mobile device satisfy at least one other criteria. A specific example of such a criteria is that some number of NACKs must have been transmitted within a sliding window.

Referring now to FIG. 5, for the network, the method starts at step 5-1 with the wireless network transmitting VoIP packets. In step 5-2, the wireless network receives NACKs that include a NACK for each VoIP packet that was not correctly received. In step 5-3, the wireless network receives fast MCS link adaptation when NACKs transmitted by the mobile device satisfy at least one other criteria. In step 5-4, based on the fast MCS link adaptation information, the wireless network adjusts an MCS used to transmit VoIP packets.

Fast MCS Link Adaptation in Combination with Slow MCS Adaptation

Various methods of fast MCS link adaptation and various methods of slow MCS link adaptation have been described. In another embodiment, a link adaptation method is provided that features a fast MCS adaptation method in combination with a slow MCS adaptation method. Particular implementations might feature a combination of one or more of the fast MCS adaptation methods described herein combined with one or more of the slow MCS adaptation methods described herein. In a specific example, a slow MCS adaptation method is used as a default MCS adaptation method and when a packet is in error, fast MCS adaptation is applied (CQI information for example by instantly feeding back together with a NACK).

Figure 6:
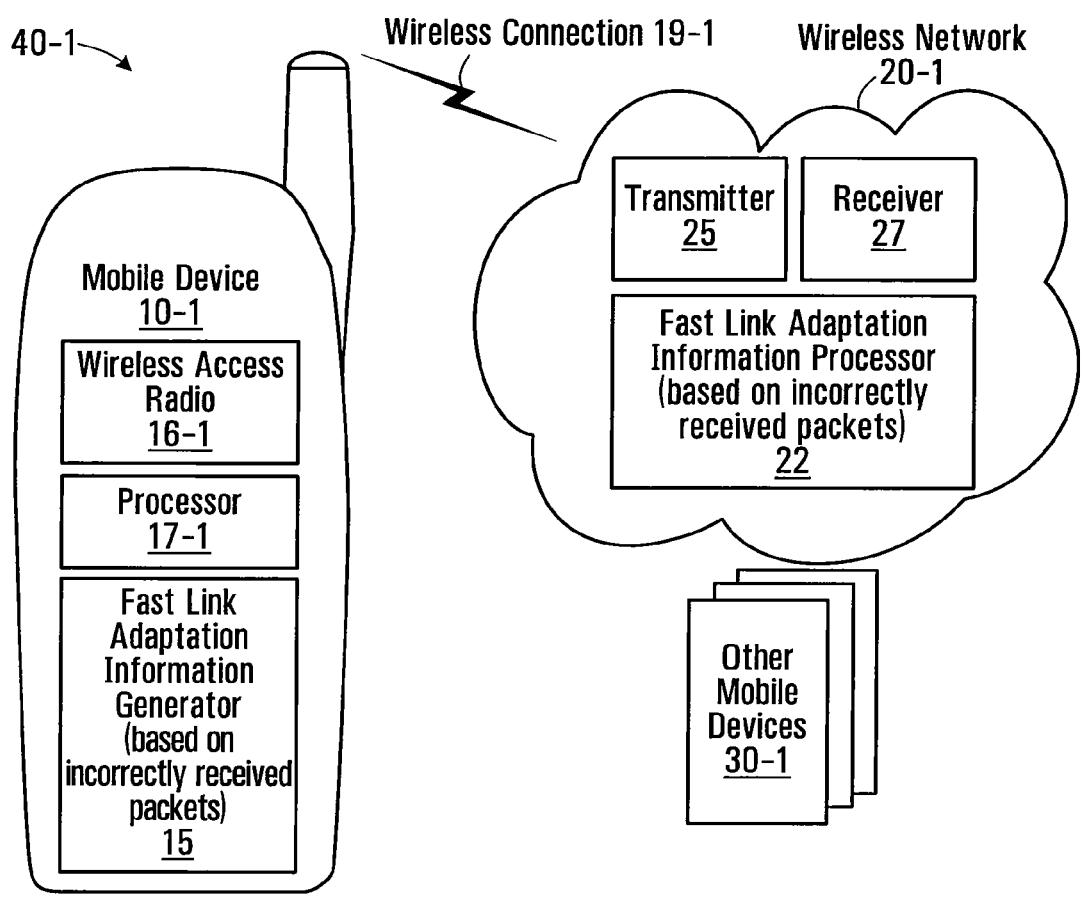
FIGS. 6 and 7 are block diagrams of a wireless system.

Referring now to FIG. 6, shown is a block diagram of an example communication system 40-1. The communication system 40-1 has a wireless network 20-1, a mobile device 10-1 and other mobile devices 30-1; the communication system 40-1 may have other components, but they are not shown for sake of simplicity. For example, the mobile device and the network will each have transmitters and receivers, and one or more antennas each. The mobile device 10-1 has a wireless access radio 16-1, a processor 17-1, and a fast link adaptation information generator (based on incorrectly received packets) 15. The mobile device 10-1 may have other components, but they are not shown for sake of simplicity. The other mobile devices 30-1 may each have components similar to those of the mobile device 10-1. Alternatively, some or all of the other mobile devices 30-1 may have different components than those of the mobile device 10-1. The wireless network 20-1 has a fast link adaptation information (based on incorrectly received packets) processor 22. The wireless network 40-1 also has a transmitter 25 and a receiver 27. In some embodiments, the fast link adaptation information processor 22, the transmitter 25, and the receiver 27 all form part of a base station or other network element that provides wireless access.

In operation, the mobile device 10-1 communicates with the wireless network 20-1 using its wireless access radio 16-1. The wireless communication is over a wireless connection 19-1 between the mobile device 10-1 and the wireless network 20-1. The other mobile devices 30-1 may similarly communicate with the wireless network 20-1 over respective wireless connections (not shown). The communication with the wireless network 20-1 might for example be telephony, or other forms of communication such as email. The fast link adaptation information generator 15 generates fast link adaptation information based on incorrectly received packets by the mobile device 10-1. Various detailed examples are given above. In the wireless network 20-1, the fast link adaptation information processor 22 processes the feedback, and performs link adaptation accordingly. In some embodiments, the fast MCS link adaptation can be sent in association with NACKs as described previously, for example once for every NACK, or based on NACKs received within a sliding window. However, in the absence of NACK feedback another mechanism is used, as described previously.

In the illustrated example, the fast link adaptation information generator 15 is implemented as software and is executed on the processor 17-1. However, more generally, the fast-link adaptation information generator 15 may be implemented as software, hardware, firmware, or any appropriate combination thereof. Similarly, the fast link adaptation processor 22 may be implemented as software, hardware, firmware, or any appropriate combination thereof.

Figure 7:
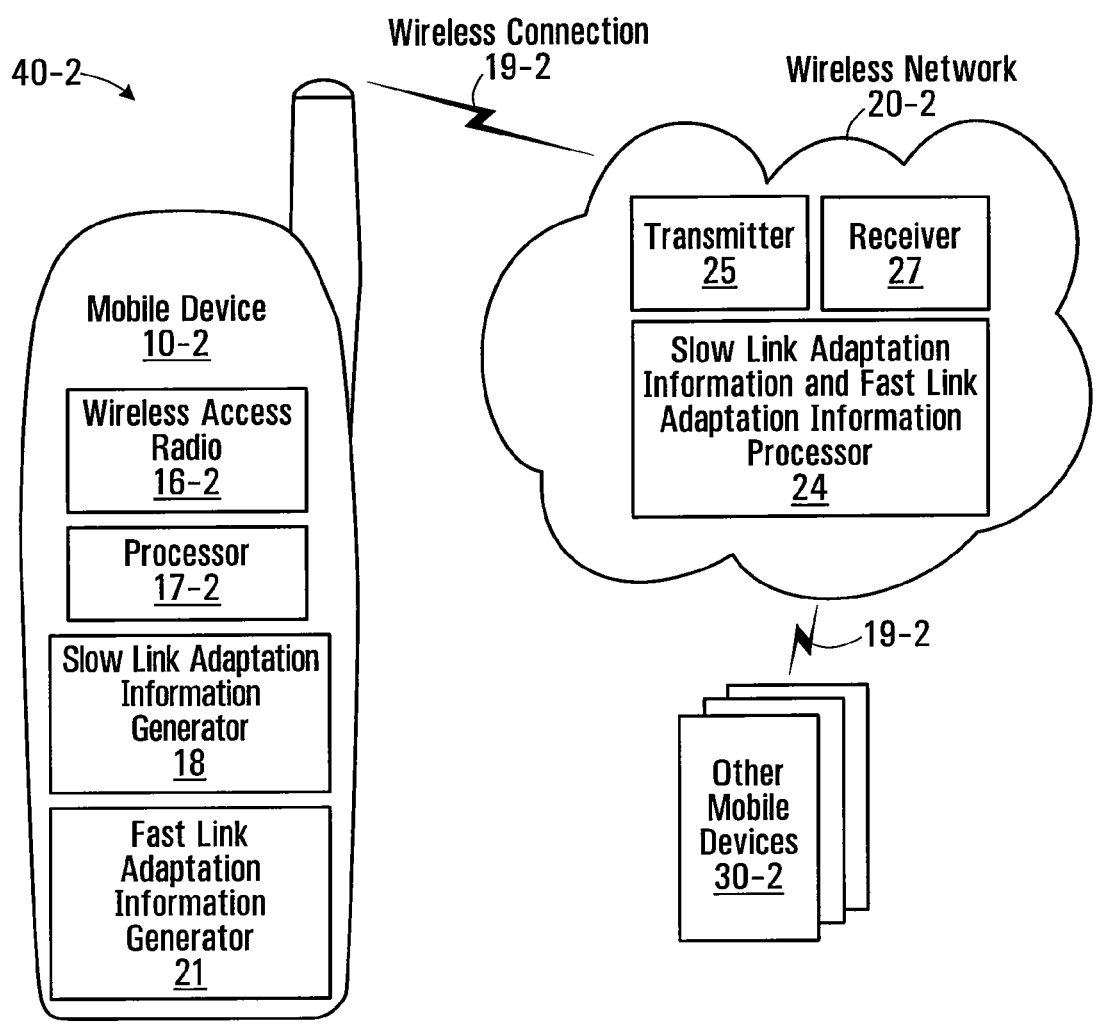

Referring now to FIG. 7, shown is a block diagram of an example communication system 40-2 for implementing mobile device assisted MCS adaptation. The communication system 40-2 has a wireless network 20-2, a mobile device 10-2, and other mobile devices 30-2; the communication system 40-2 may have other components, but they are not shown for sake of simplicity. The mobile device 10-2 has a wireless access radio 16-2, a processor 17-2, a slow link adaptation information generator 18 and a fast link adaptation information generator 21. The mobile device 10-2 may have other components, but they are not shown for sake of simplicity. The other mobile devices 30-2 may each have components similar to those of the mobile device 10-2. Alternatively, some or all of the other mobile devices 30-2 may have different components than those of the mobile device 10-2. The wireless network 20-2 has a slow link adaptation information and fast link adaptation information processor 24 that performs MCS adaptation based on the slow link adaptation information and the fast link adaptation information received from the mobile device. The wireless network also has a transmitter 25 and a receiver 27. In some embodiments, the slow link adaptation information and fast link adaptation information processor 24, the transmitter 25, and the receiver 27 all form part of a base station or other network element that provides wireless access.

In operation, the mobile device 10-2 communicates with the wireless network 20-2 using its wireless access radio 16-2. The wireless communication is over a wireless connection 19-2 between the mobile device 10-2 and the wireless network 20-2. The other mobile devices 30-2 may similarly communicate with the wireless network 20-2 over respective wireless connections (not shown). The communication with the wireless network 20-2 might for example be telephony, or other forms of communication such as email. The slow link adaptation information generator 18 generates and transmits slow link adaptation information to network. Various examples of how this might be done, and what this might constitute, are described above. In addition, the fast link adaptation information generator 21 generates and transmits fast link adaptation information to the network. Again, various examples of how this might be done, and what this might constitute, are described above. The slow link adaptation information and fast link adaptation information processor takes both types of link adaptation information and performs MCS adaptation based thereon. This can be done in a joint fashion (considering both types of feedback when both are available) or more or less independently (considering each type of feedback on its own as it is received).

Another Mobile Device

Figure 8:
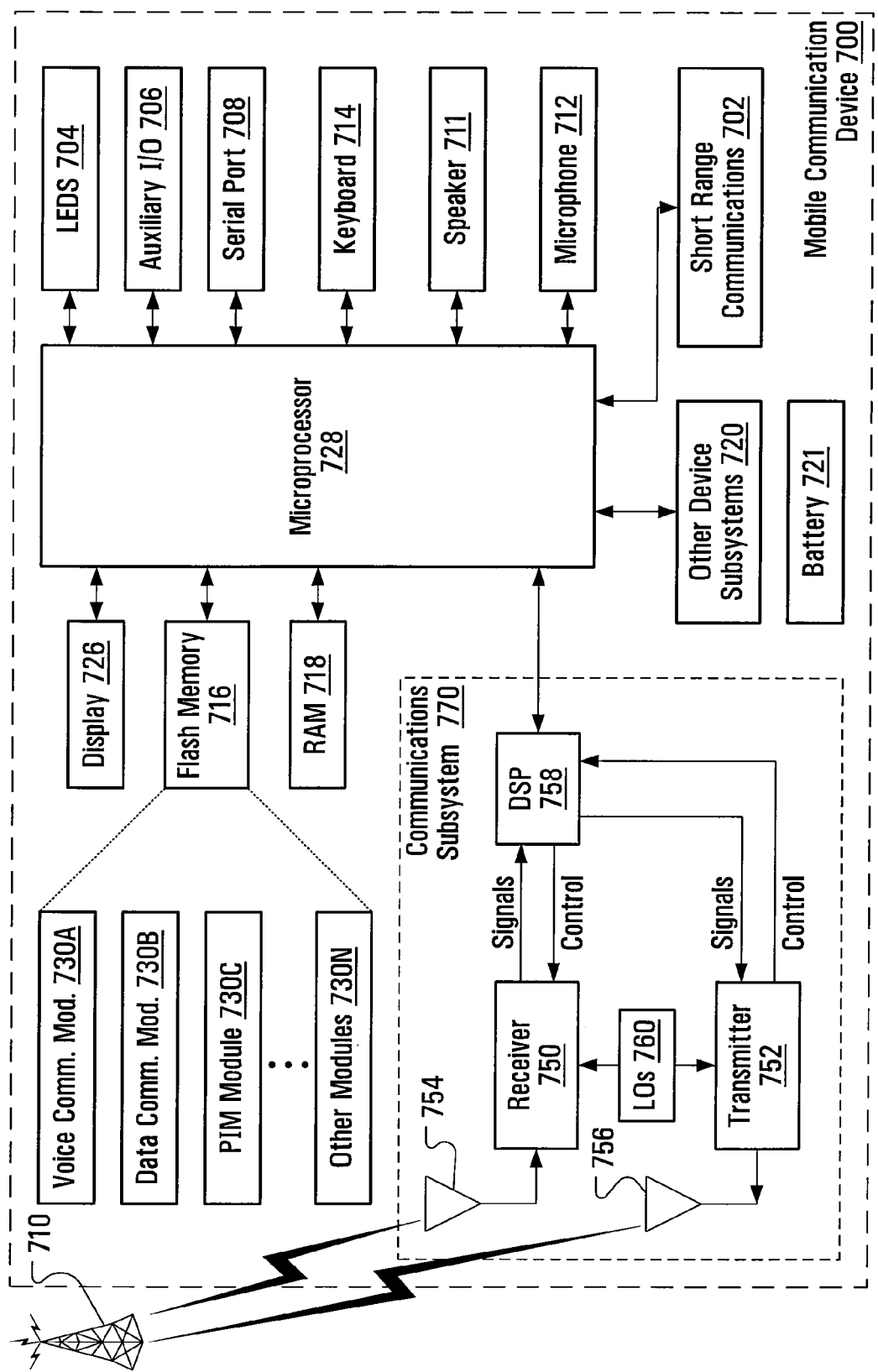
FIG. 8 is a block diagram of a mobile device.

Referring now to FIG. 8, shown is a block diagram of another mobile device that may implement any of the mobile device methods described herein. The mobile device 100 is shown with specific components for implementing features similar to those of the mobile device 10-1 of FIG. 6 or mobile device 10-2 of FIG. 7. It is to be understood that the mobile device 100 is shown with very specific details for example purposes only.

A processing device (a microprocessor 128) is shown schematically as coupled between a keyboard 114 and a display 126. The microprocessor 128 is a type of processor with features similar to those of the processor 14 of the mobile devices shown in FIGS. 6 and 7. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture. One or more of the modules 130A,130B,130C,130N of the flash memory 116 can be configured for implementing features similar to those of the mobile device shown in FIGS. 6 and 7.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio of the mobile device 10 shown in FIGS. 6 and 7. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present application are possible in light of the above teachings. It is therefore to be understood that within the scope of the appended claims, the application may be practised otherwise than as specifically described herein.

We claim:

1. A method in a mobile device comprising:
receiving packets;
transmitting fast MCS (modulation and coding scheme) link adaptation information based on incorrectly received packets,
wherein transmitting fast MCS link adaptation information based on incorrectly received packets comprises:
transmitting NACKs (negative acknowledgements) that indicate which packets were received incorrectly; and
transmitting fast MCS link adaptation information in association with the NACKs when the NACKs transmitted by the mobile device satisfy at least one other criteria,
wherein transmitting fast MCS link adaptation information when the NACKs transmitted by the mobile device satisfy at least one other criteria comprises:
transmitting fast MCS link adaptation information when the transmitted NACKs include a number of transmitted NACKs within a sliding window that is greater than a predefined number.

2. The method of claim 1, wherein receiving packets comprises receiving packets that are VoIP (voice over internet protocol) packets, constant rate packets, real-time packets or constant rate real-time packets.

3. The method of claim 1, wherein the fast MCS link adaptation comprises at least one of:
a CQI (channel quality indication);
a received signal value; and
an MCS decision made by the mobile device.

4. The method of claim 1, further comprising:
combining the fast MCS link adaptation information with NACKs using code division multiplexing.

5. The method of claim 1, further comprising:
transmitting slow MCS link adaptation information from less frequently than transmitting fast MCS link adaption information.

6. A method in a wireless network comprising:
transmitting packets;
receiving fast MCS (modulation and coding scheme) link adaptation information based on transmitted packets that were incorrectly received;

based on the fast MCS link adaptation information, adjusting an MCS used to transmit the packets,
wherein receiving fast MCS link adaptation information based on transmitted packets that were incorrectly received comprises:
receiving NACKs (negative acknowledgements) that indicate which packets were received incorrectly; and
receiving fast MCS link adaptation information in association with the NACKs when the NACKs satisfy at least one other criteria;
wherein receiving fast MCS link adaptation information when the NACKs received from a mobile device satisfy at least one other criteria comprises:
receiving fast MCS link adaptation information when the received NACKs include a number of received NACKs within a sliding window that is greater than a predefined number.

7. The method of claim 6, wherein transmitting packets comprises transmitting packets that are VoIP (voice over internet protocol) packets, constant rate packets, real-time packets or constant rate real-time packets.

8. The method of claim 6, wherein the fast MCS link adaptation comprises at least one of:
a CQI (channel quality indication);
a received signal value; and
an MCS decision made by the mobile device.

9. The method of claim 6, further comprising:
combining the fast MCS link adaptation information with NACKs using code division multiplexing.

10. The method of claim 6, further comprising:
receiving slow MCS link adaptation information less frequently than receiving fast MCS link adaption information; and
making MCS decisions based on the slow MCS link adaptation.

11. The method of claim 6, further comprising:
processing received NACKs received over a time window to make a slow MCS adaptation decision.

12. A mobile device comprising:
a wireless access radio configured to receive packets;
a fast link adaptation information generator configured to generate fast MCS (modulation and coding scheme) link adaptation information based on incorrectly received packets, and to transmit the fast MCS link adaptation information using the wireless access radio, by transmitting NACKs (negative acknowledgements) that indicate which packets were received incorrectly and transmitting fast MCS link adaptation information in association with the NACKs when the NACKs transmitted by the mobile device satisfy at least one other criteria;
wherein transmitting fast MCS link adaptation information when the NACKs transmitted by the mobile device satisfy at least one other criteria comprises:
transmitting fast MCS link adaptation information when the transmitted NACKs include a number of transmitted NACKs within a sliding window that is greater than a predefined number.

13. A wireless network comprising:
a transmitter that transmits packets;
a receiver that receives fast MCS (modulation and coding scheme) link adaptation information based on transmitted packets that were incorrectly received by receiving NACKs (negative acknowledgements) that indicate which packets were received incorrectly and receiving fast MCS link adaptation information in association with the NACKs when the NACKs satisfy at least one other criteria;
a fast link adaptation information processor that adjusts an MCS used to transmit the packets based on the fast MCS link adaptation information;
wherein receiving fast MCS link adaptation information when the NACKs received from a mobile device satisfy at least one other criteria comprises:
receiving fast MCS link adaptation information when the received NACKs include a number of received NACKs within a sliding window that is greater than a predefined number.

\* \* \* \* \*